US008384967B2

(12) United States Patent
Shinkawa

(10) Patent No.: US 8,384,967 B2
(45) Date of Patent: Feb. 26, 2013

(54) IMAGE SCANNING DEVICE, IMAGE FORMING APPARATUS, AND LIGHT SOURCE FAILURE DETECTION METHOD

(75) Inventor: Shohei Shinkawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 322 days.

(21) Appl. No.: 12/923,708

(22) Filed: Oct. 5, 2010

(65) Prior Publication Data

US 2011/0085214 A1 Apr. 14, 2011

(30) Foreign Application Priority Data

Oct. 13, 2009 (JP) .................................. 2009-236536

(51) Int. Cl.
*H04N 1/04* (2006.01)
(52) U.S. Cl. ......... 358/475; 358/474; 358/496; 358/497
(58) Field of Classification Search .................. 358/475, 358/474, 496, 497, 498
See application file for complete search history.

(56) References Cited

U.S. PATENT DOCUMENTS

| 6,521,879 B1 * | 2/2003 | Rand et al. | 250/205 |
| 2010/0007277 A1 * | 1/2010 | Woodward et al. | 315/77 |
| 2010/0129116 A1 | 5/2010 | Shinkawa | |
| 2011/0007104 A1 * | 1/2011 | Nakazawa et al. | 345/690 |
| 2011/0085214 A1 * | 4/2011 | Shinkawa | 358/475 |

FOREIGN PATENT DOCUMENTS

| JP | 2002-320070 A | 10/2002 |
| JP | 2007-150934 A | 6/2007 |
| JP | 2007-243580 A | 9/2007 |
| JP | 2008-124891 A | 5/2008 |
| JP | 2008-172389 A | 7/2008 |
| JP | 2008-199247 A | 8/2008 |
| JP | 2008-299195 A | 12/2008 |
| JP | 2009-010285 A | 1/2009 |
| JP | 2009-010830 A | 1/2009 |

* cited by examiner

*Primary Examiner* — Houshang Safaipour
(74) *Attorney, Agent, or Firm* — Harness, Dickey & Pierce, P.L.C.

(57) ABSTRACT

An image scanning device includes lighting circuits; a light source including light-emitting elements arranged in a line such that the light-emitting elements connected in series to the same lighting circuit are not positioned adjacent to each other; a reflecting part; a photoelectric conversion unit photoelectrically converting reflected light from the reflecting part; a lighting control unit selectively turning on one of the lighting circuits; a memory storing an area information table containing information on main-scanning areas of the photoelectric conversion unit in association with identification information of the lighting circuits; and a failure determining unit identifying the main-scanning areas corresponding to the identification information of the turned-on lighting circuit by referring to the area information table and comparing intensities of the reflected light entering the identified main-scanning areas with a first threshold to determine whether the light-emitting elements connected to the turned-on lighting circuit are at fault.

9 Claims, 14 Drawing Sheets

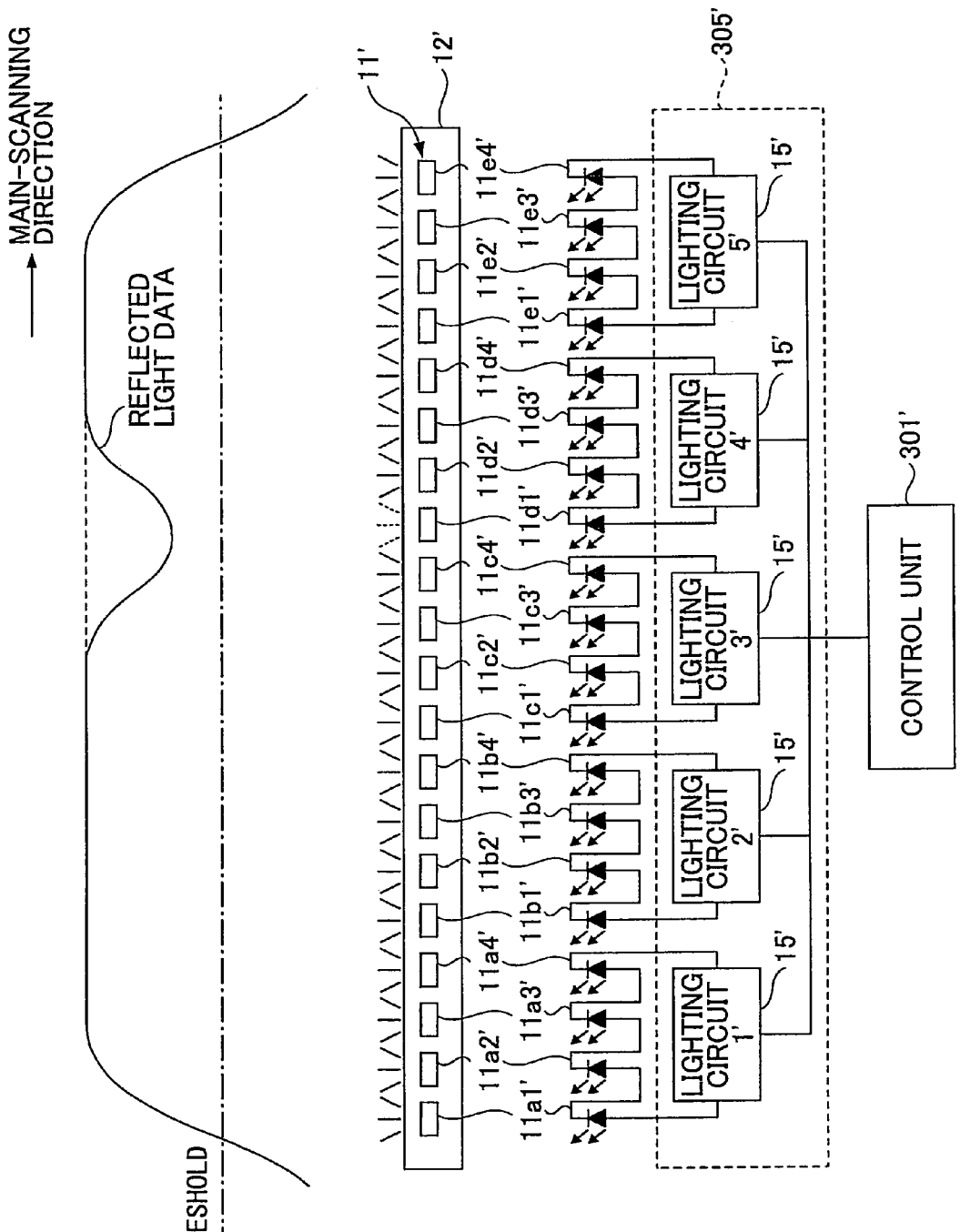

FIG.10

|  | CCD ELEMENT NUMBER | LED NUMBER |
|---|---|---|
| LIGHTING CIRCUIT 1 | 1-10 | 1(LED11a1) |
|  | 51-60 | 6(LED11a2) |
|  | 101-110 | 11(LED11a3) |
|  | 151-160 | 16(LED11a4) |
| LIGHTING CIRCUIT 2 | 11-20 | 2(LED11b1) |
|  | 61-70 | 7(LED11b2) |
|  | 111-120 | 12(LED11b3) |
|  | 161-170 | 17(LED11b4) |
| LIGHTING CIRCUIT 3 | 21-30 | 3(LED11c1) |
|  | 71-80 | 8(LED11c2) |
|  | 121-130 | 13(LED11c3) |
|  | 171-180 | 18(LED11c4) |
| LIGHTING CIRCUIT 4 | 31-40 | 4(LED11d1) |
|  | 81-90 | 9(LED11d2) |
|  | 131-140 | 14(LED11d3) |
|  | 181-190 | 19(LED11d4) |
| LIGHTING CIRCUIT 5 | 41-50 | 5(LED11e1) |
|  | 91-100 | 10(LED11e2) |
|  | 141-150 | 15(LED11e3) |
|  | 191-200 | 20(LED11e4) |

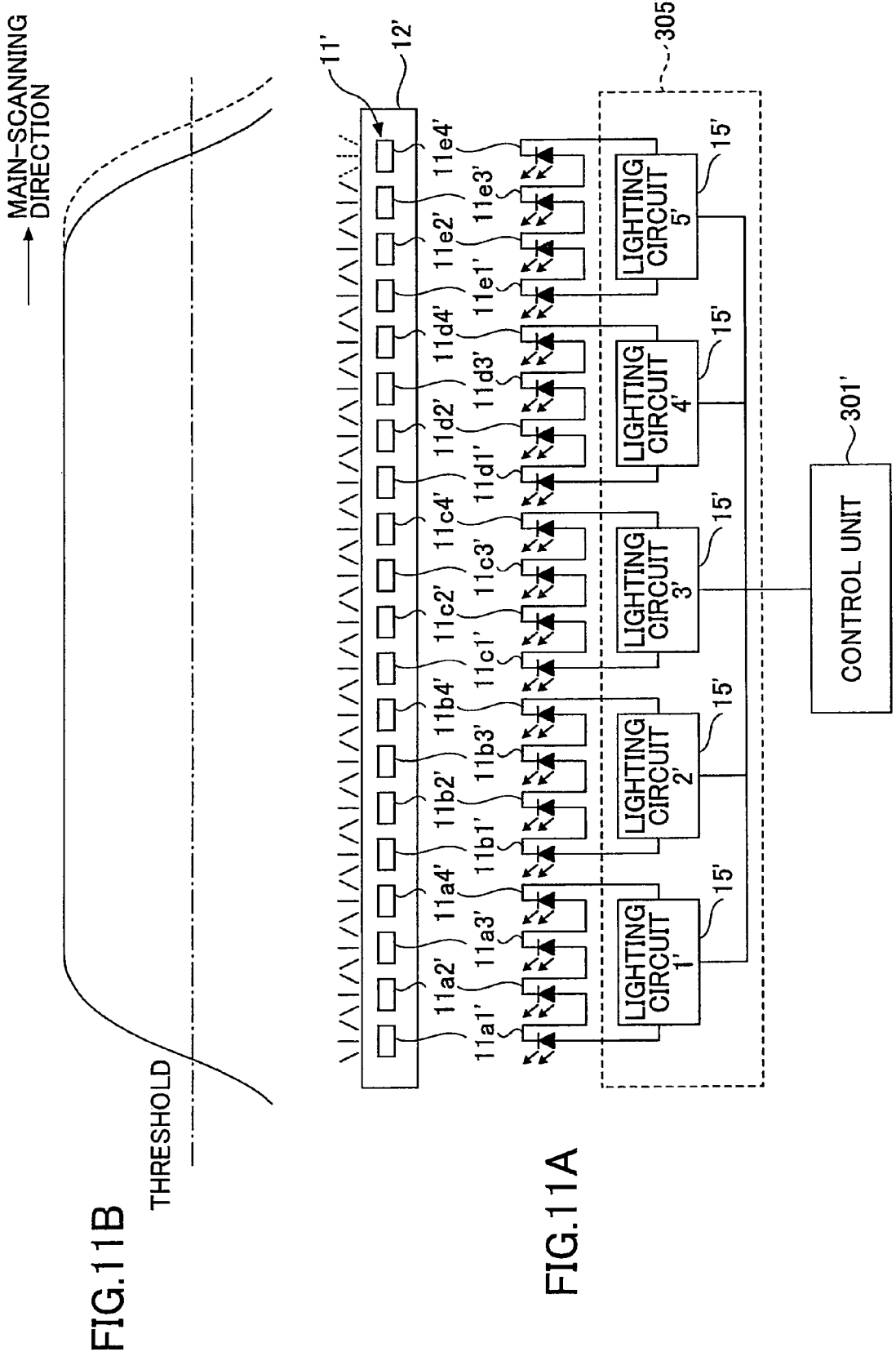

IMAGE SCANNING DEVICE, IMAGE FORMING APPARATUS, AND LIGHT SOURCE FAILURE DETECTION METHOD

BACKGROUND OF THE INVENTION

1. Field of the Invention

A certain aspect of the present invention relates to an image scanning device, an image forming apparatus, and a light source failure detection method.

2. Description of the Related Art

In these days, light-emitting diodes (LED) are more commonly used than xenon lamps as light sources for scanning a document in apparatuses such as a multifunction peripheral (MFP) and a scanner. Using LEDs as light sources makes it possible to reduce the start-up time, to save energy, and to lengthen the service lifetime of an apparatus. When using LEDs in a reducing optical system, the illuminance on a document surface needs to be higher than that in an 1X optical system because, compared with an 1X optical system, the distance between the document surface and an image sensor is longer and the attenuation of light is larger due to the longer distance. Therefore, in a reducing optical system, multiple LEDs are arrayed in the main-scanning direction to increase the luminance on the document surface.

Typically, in such an LED illumination system, serially-connected LEDs are arranged in the main-scanning direction to illuminate a document in the main-scanning direction. With this configuration, however, the document is not correctly scanned and an inaccurate image is formed if just one of the LEDs fails.

There are various known methods for detecting failure of LEDs. In one method, a moving body on which a light source is mounted is moved to an area where visual inspection is carried out. In another method, light reflected from a white reference part used as a white reference in shading correction is detected and failed LEDs are determined based on abnormal distribution of the detected light (see, for example, Japanese Patent Application Publication No. 2007-150934 and Japanese Patent Application Publication No. 2009-10830)

Japanese Patent Application Publication No. 2007-150934 discloses an LED failure determining, method where all LEDs are turned on, light reflected from a reference plate used for shading correction is detected to obtain reference plate data, and failed LEDs are determined based on abnormal distribution of the reference plate data.

Japanese Patent Application Publication N 2009-10830 discloses an LED failure determining method where each group of adjacent LEDs connected to the same light intensity control unit are defined as a block and blocks including failed LEDs are identified based on reference plate data obtained by scanning a reference plate used for shading correction.

In another LED failure determining method, LEDs are separately turned on and off to determine failed LEDs (see, for example, Japanese Patent Application Publication No. 2007-243580 and Japanese Patent Application Publication No. 2002-320070). Japanese Patent Application Publication No. 2007-243580 discloses a technology where LEDs are selectively turned on during pre-scanning to reduce power consumption. Japanese Patent Application Publication No. 2002-320070 discloses a technology where LEDs are sequentially turned on and light reflected from a reference white plate is detected to determine failed LEDs and thereby to compensate for decrease in light intensity.

Also, there is a technology for allowing the user to determine failed LEDs by visual inspection (see, for example, Japanese Patent Application Publication No. 2008-199247).

Japanese Patent Application Publication No. 2008-199247 discloses a technology where a carriage holding LEDs is moved to a position at which the LEDs can be seen from the outside and the LEDs are turned on sequentially or selectively.

Further, there is a technology for separately mounting LEDs (see, for example, Japanese Patent Application Publication No. 2008-172389). Japanese Patent Application Publication No. 2008-172389 discloses a technology where LED arrays each including at least one light-emitting element are separately held on a mounting table so that LEDs can be efficiently replaced.

However, if all LEDs are turned on at the same time as disclosed in JP2007-150934, it is difficult to detect failure of a small number (e.g., 1 through several) of LEDs. Similarly, if all LEDs in each block are turned on at the same time as disclosed in JP2009-10830, it is difficult to detect failure of a small number (e.g., 1 through several) of LEDs in the block.

In an LED illumination system, the pitch. between LEDs is set at a small value to increase the number of LEDs and thereby to achieve a high light intensity. Therefore, even if one to several LEDs in a large number of LEDs are at fault and their light intensity is low or they are not emitting light, it is difficult to distinguish the resulting decrease in the light intensity from that caused, for example, by variation in the sensitivity of image sensors (e.g., CCDs), variation in the drive current, or blocking of light by a stain or dust in the optical path. Also, it is difficult to detect failed LEDs at both ends in the main-scanning direction because it is difficult to distinguish the decrease in the light intensity caused by the failed LEDs at the ends from that caused by inaccurate mounting positions of LEDs.

Meanwhile, it is possible to detect even one failed LED by turning on LEDs selectively or separately as disclosed in JP2007-243580, JP2002-320070, and JP2008-199247. However, with the related-art configurations, complicated wiring is necessary to selectively or separately turn on LEDs.

SUMMARY OF THE INVENTION

An aspect of the present invention provides an image scanning device for generating image data of a target medium. The image scanning device includes lighting circuits; a light source including light-emitting elements connected to the lighting circuits, the light-emitting elements being arranged in a line such that a group of the light-emitting elements connected in series to the same one of the lighting circuits are not positioned adjacent to each other; a reflecting part for shading correction extending in a main-scanning direction; a photoelectric conversion unit photoelectrically converting reflected light from the reflecting part; a lighting control unit selectively turning on one of the lighting circuits; a memory storing an area information table containing information on main-scanning areas of the photoelectric conversion unit in association with identification information of the lighting circuits; and a failure determining unit identifying the main-scanning areas of the photoelectric conversion unit corresponding to the identification information of the one of the lighting circuits turned on by the lighting control unit by referring to the area information table and comparing intensities of the reflected light entering the identified main-scanning areas with a first threshold to determine whether the light-emitting elements connected to the one of the lighting circuits are at fault.

Another aspect of the present invention provides a method of detecting light source failure for an image scanning device. The image scanning device includes lighting circuits; a light source including light-emitting elements connected to the lighting circuits, the light-emitting elements being arranged in a line such that a group of the light-emitting elements connected in series to the same one of the lighting circuits are not positioned adjacent to each other; a reflecting part for shading correction extending in a main-scanning direction; a photoelectric conversion unit photoelectrically converting reflected light from the reflecting part; a lighting control unit; a memory storing an area information table containing information on main-scanning areas of the photoelectric conversion unit in association with identification information of the lighting circuits; and a failure determining unit. The method includes the steps of selectively turning on one of the lighting circuits by the lighting control unit; identifying, by the failure determining unit, the main-scanning areas of the photoelectric conversion unit corresponding to the identification information of the one of the lighting circuits turned on by the lighting control unit by referring to the area information table; and comparing, by the failure determining unit, intensities of the reflected light entering the identified main-scanning areas with a first threshold to determine whether the light-emitting elements connected to the one of the lighting circuits are at fault.

BRIEF DESCRIPTION OF THE DRAWINGS

FIG. 8A is a drawing illustrating an LED driving unit and LEDs according to the related art;

FIG. 8B is a graph showing exemplary reflected light data;

FIG. 10 is a table showing CCD numbers registered in association with lighting circuits;

FIG. 11A is a drawing illustrating an LED driving unit and LEDs according to the related art;

FIG. 11B is a graph showing exemplary reflected light data;

DESCRIPTION OF THE PREFERRED EMBODIMENTS

Preferred embodiments of the present invention are described below with reference to the accompanying drawings.

An image scanning device according to an embodiment of the present invention is outlined below. In this embodiment, LEDs are arranged in a line on an LED array board. Two or more LEDs are turned on and off by one lighting circuit, and lighting circuits are connected to LEDs in the following manner:

(1) Each lighting circuit is connected to two or more LEDs that are not adjacent to each other. In other words, LEDs connected to the same lighting circuit are not adjacent to each other.

(2) Each lighting circuit is connected to two or more LEDs in series and is able to turn on the LEDs independently from other lighting circuits.

An image forming apparatus (image scanning unit) of this embodiment turns on all LEDs connected to one lighting circuit at the same time and determines failed LEDs by detecting reflected light in main-scanning areas corresponding to the turned-on LEDs. Since the LEDs turned on by one lighting circuit are not adjacent to each other, reflected light of a normal LED shows a peak value at a position corresponding to the LED. Therefore, this configuration makes it possible to detect even one failed LED at an end. Also, since multiple LEDs are connected in series to one lighting circuit, it is possible to simplify the wiring and to reduce production costs.

<Outline of Image Forming Apparatus>

Figure 1:
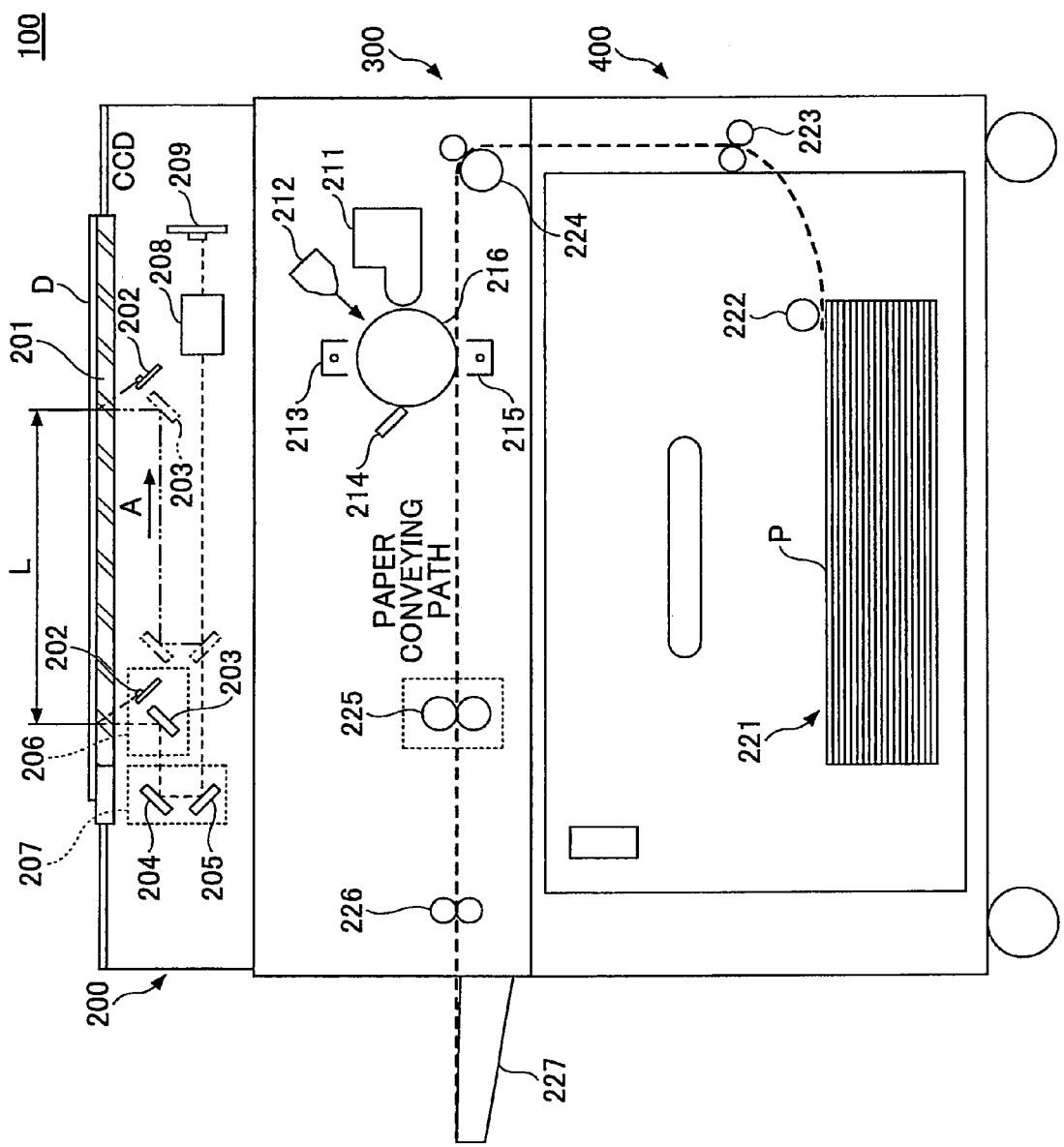
FIG. 1 is a drawing illustrating an exemplary configuration of an image forming apparatus.

FIG. 1 is a drawing illustrating an exemplary configuration of an image forming apparatus 100. The image forming apparatus 100 includes an image scanning unit (image scanning device) 200, an image forming unit 300, and a paper-feeding unit 400. The image forming apparatus 100 may also include an auto document feeder (ADF) that feeds documents placed on a document feeding table one-by-one onto a contact glass 201 and ejects the documents onto a paper-catch tray after they are scanned by the image scanning unit 200.

The image scanning unit 200 includes the contact glass 201 and an optical scanning system including a light source unit 202, a first mirror 203, a second mirror 204, a third mirror 205, a lens 208, and a line CCD (photoelectric conversion unit) 209 (full color or monochrome). The light source unit 202 and the first mirror 203 are mounted on a first carriage 206 that is moved at a constant speed in the sub-scanning direction (indicated by an arrow A) by a stepping motor (not shown) when a document is scanned. The second mirror 204 and the third mirror 205 are mounted on a second carriage 207. The second carriage 207 is moved at a speed that is about one half of the speed of the first carriage 206 by a stepping motor (not shown) when a document is scanned.

An image surface of the document is optically scanned by moving the first carriage 206 and the second carriage 207. Light reflected from the image surface of the document is focused by the lens 208 on a light receiving surface of the CCD 209 and is photoelectrically converted by the CCD 209. As a result of the photoelectric conversion, the CCD 209 outputs image data including red (R), green (G), and blue (B) color components. The image data are converted from analog to digital, and an image processing unit 302 (see FIG. 5) performs image processing (e.g., gamma correction, color conversion, image separation, and tone correction) on the converted image data. The CCD 209 includes photoelectric conversion elements (hereafter called CCD elements) arranged (e.g., t 600 dpi) in the main-scanning direction.

The image forming unit 300 forms a latent image on a photosensitive drum (intermediate drum) 216 based on the processed image data (or image data generated from print data transmitted from a personal computer). In the example shown in FIG. 1, the image forming unit 300 includes one developing unit 211 and therefore is able to form a monochrome image. Alternatively, the image forming unit 300 may include multiple developing units 211 disposed around the photosensitive drum 216 so as to be able to form a multicolor image. Also in the image forming unit 300 of FIG. 1, it is assumed that a toner image is transferred directly from the photosensitive drum 216 onto recording paper P. Alternatively, the image forming unit 300 may also include an intermediate transfer belt, and a toner image may be transferred from the photosensitive drum 216 onto the intermediate transfer belt and then transferred from the intermediate transfer belt onto the recording paper P.

The image forming unit 300 includes the photosensitive drum 216 used as an image carrier, a charging unit 213 for charging the photosensitive drum 216, an exposing unit 212 for exposing the photosensitive drum 216, the developing unit 211, and a cleaning unit 214. The exposing unit 212 is, for example, implemented by a laser illumination unit or an LED, writing unit including a light emitting diode (LED) array arranged in the axis direction (the main-scanning direction) of the photosensitive drum 216 and a lens array. The exposing unit 212 illuminates the photosensitive drum 216 with a laser beam according to the processed image data and thereby forms an electrostatic latent image on the photosensitive drum 216. The developing unit 211 includes a developing roller carrying a developer including toner. The developing roller rotates to visualize (or develop) the electrostatic latent image formed on the photosensitive drum 216 with the toner and thereby forms a toner image.

The toner image formed on the photosensitive drum 216 is transferred onto the recording paper P transfer position where the photosensitive drum 216 is in contact with the recording paper P. A transfer unit 215 is disposed at the transfer position so as to face the photosensitive drum 216. The transfer unit 215 applies a voltage to the recording paper P to generate an intermediate transfer electric field that causes the toner image to be transferred onto the recording paper P. Thus, the toner image is transferred from the photosensitive drum 216 onto the recording paper P due to the generated intermediate transfer electric field.

The paper-feeding unit 400 feeds the recording. paper P from a paper feed tray 221 to resist rollers 224. The paper feed tray 221 includes a paper feed roller 222 that feeds sheets of the recording paper P contained in the paper feed tray 221 one by one from the top. The recording paper P is then conveyed along a paper conveying path indicated by a dotted line. A conveying roller pair 223 is provided in the paper conveying path. The conveying roller pair 223 feeds the recording paper P conveyed from the paper feed tray 221 to the resist rollers 224. After a predetermined period of time from when the leading edge of the recording paper P is detected by a resist sensor (not shown), the recording paper P is stopped with its leading edge placed between the resist rollers 224. The resist rollers 224 feed the recording paper P to the transfer position at a specific timing. The specific timing is when the toner image is conveyed to the transfer position by the rotation of the photosensitive drum 216.

The recording paper P is further conveyed by a roller pair (not shown) along the paper conveying path to a fusing unit 225. The fusing unit 225 applies heat and pressure to the recording paper P to fuse the transferred toner image onto the surface of the recording paper P. After going through the fusing unit 225, the recording paper P is ejected by an ejection roller pair 226 onto a paper-catch tray 227. Although the image forming unit 300 of this embodiment is configured to form an image by electrophotography, the image forming unit 300 may be configured to form an image by inkjet printing.

Figure 2:
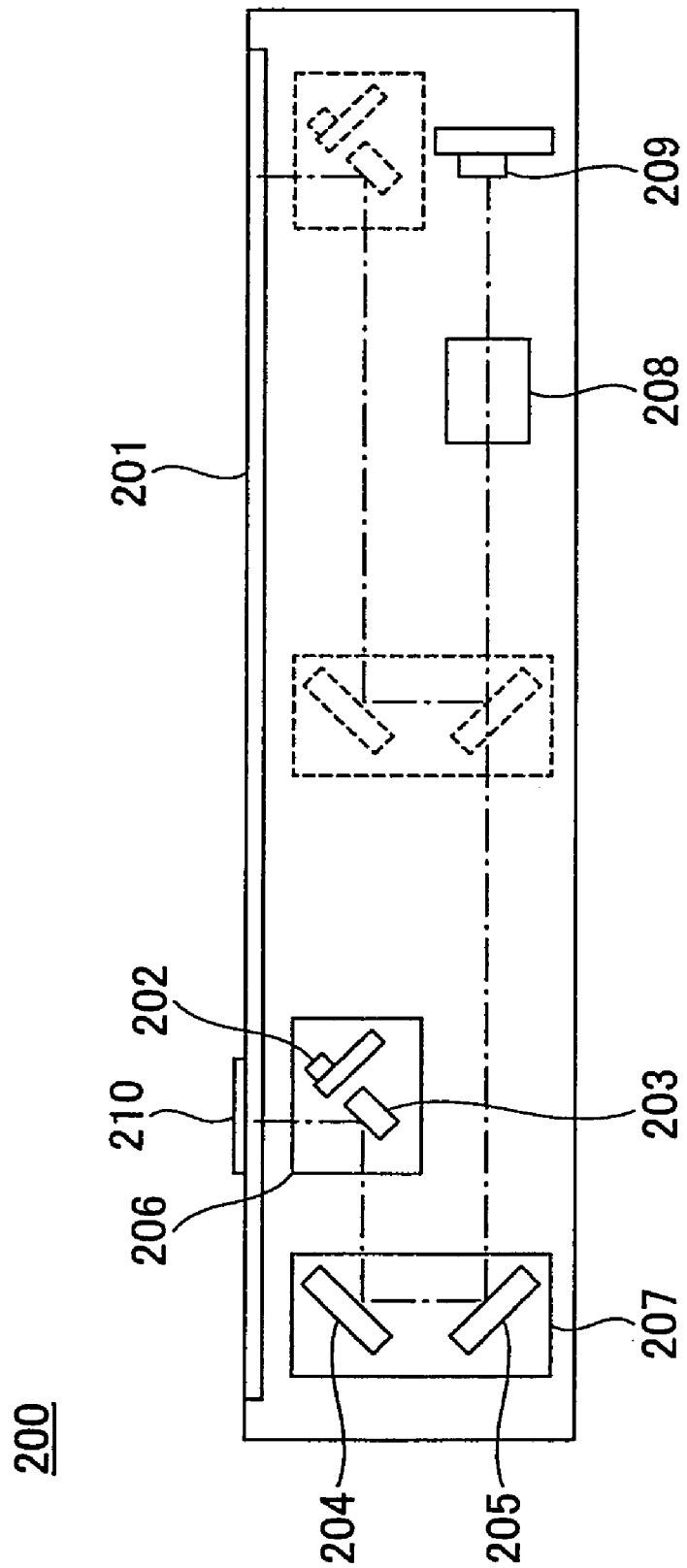
FIG. 2 is a drawing illustrating an exemplary configuration of an image scanning unit.

The image scanning unit 200 is described in more detail with reference to FIG. 2. In FIG. 2, the same reference numbers are used for parts corresponding to those shown in FIG. 1, and descriptions of those parts are omitted. In the image scanning unit 200, the light source unit 202 illuminates a document on the contact glass 201. Diffuse reflected light from the document is reflected by the first, second, and third mirrors 203, 204, and 205, goes through the lens 208, and enters the CCD 209. Then, the CCD elements of the CCD 209 convert the diffuse reflected light into an electric signal.

The image scanning unit 200 also includes a white reference plate 210 used to obtain shading data for shading correction. The white reference plate 210 is disposed on a part of the upper surface of the contact glass (in a position in the sub-scanning direction where the document is not placed) and extends in the main-scanning direction. The white reference plate 210 is a uniform plate with high reflectivity. A control unit 301 described later obtains shading data based on reflected light from the white reference plate 210 illuminated by the light source unit 202 and performs shading correction based on the obtained shading data. The shading data indicate the distribution of received light intensity in the line direction of the CCD 209.

There are two image scanning methods for a color image forming apparatus: a light source switching method and a color sensor method. In the light source switching method, red (R), green (G), and blue light sources and one line sensor are used; and the R, G, and B light sources are switched for each scanning line of the line sensor to obtain line image data for each of the R, G, and B colors. Accordingly, in this method, three light source units 202 are used. In the color sensor method, R, G, and B color line sensors and a white light source are used; and line image data of the R, G, and B colors are obtained at the same time by the three line sensors. Accordingly, in this method, one light source unit 202 is used. When multiple light source units 202 are used, light source failure detection is performed for each of the light source units 202.

Figure 3:
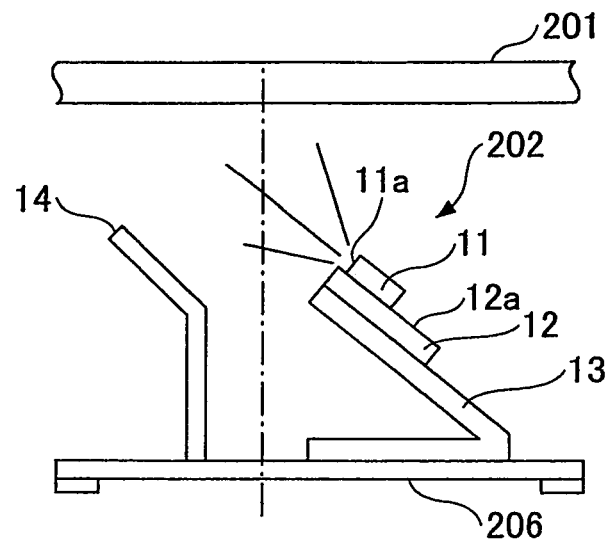
FIG. 3 is a cut-away side view of a light source unit.
Figure 4:
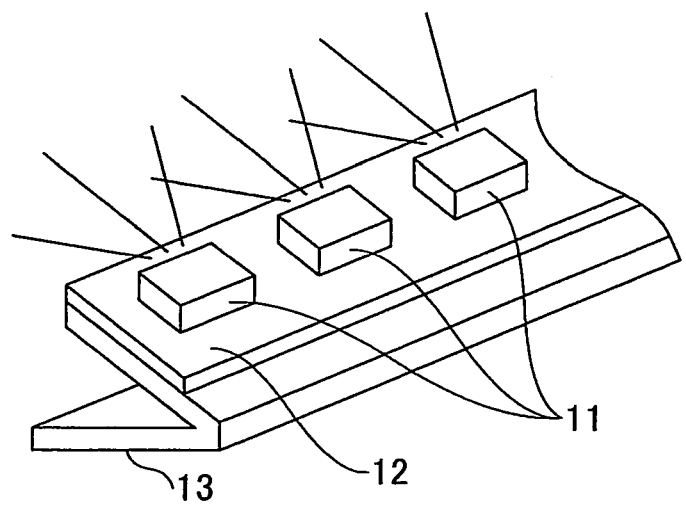
FIG. 4 is a perspective view of a light source unit.

FIG. 3 is a cut-away side view of the light source unit 202, and FIG. 4 is a perspective view of the light source unit 202. The light source unit 202 includes an LED array board 12 that is a circuit board and shaped like a flat plate, and multiple LEDs 11 arranged in a line in the main-scanning direction on the LED array board 12. Alternatively, the LEDs 11 may be arranged in a staggered manner such that an LED 11 is shifted in the sub-scanning direction from another LED 11 or a group of LEDs 11 is shifted in the sub-scanning direction from another group. The LED array board 12 is disposed such that its long side extends substantially horizontally in a direction orthogonal to the moving direction of the first carriage 206, i.e., in the main-scanning direction.

Wiring patterns and circuit elements (not shown) for supplying power to the LEDs 11 are formed on the LED array board 12. Alternatively, the wiring patterns and the circuit elements may be formed on a control board other than the LED array board 12. The wiring patterns are formed on the LED array board 12 such that an LED 11 connected to a lighting circuit 15 can be turned on even if another LED 11 connected to the same lighting circuit 15 fails.

Each LED 11 includes a light-emitting surface 11*a* and is positioned on the LED array board 12 such that the light-emitting surface 11*a* forms a substantially right angle with a board surface 12*a* of the LED array board 12. Accordingly, the center line of light emitted from the light-emitting surface 11*a* of the LED 11 is substantially parallel to the board surface 12*a* of the LED array board 12.

The LED array board 12 is placed on a sloping surface of a mounting part 13 which is tilted with respect to the contact glass 201. In other words, the mounting part 13 is mounted on the first carriage 206 such that the light-emitting surface 11*a* of the LED 11 is tilted with respect to the contact glass 201 and the diffuse reflected light from the document enters the first mirror 203.

In this embodiment, the first carriage 206 includes an opposed reflecting plate 14 used to reflect light from the LEDs 11 to optimize illumination distribution and to prevent shadows when scanning a cut-and-paste document. As described above, the light source unit 202 has a typical configuration used for a reducing optical system. However, the light source failure detection method of this embodiment may be applied to any light source unit using LEDs regardless of the tilt angle of the light-emitting surface 11*a* and the presence of the opposed reflecting plate 14.

Figure 5:
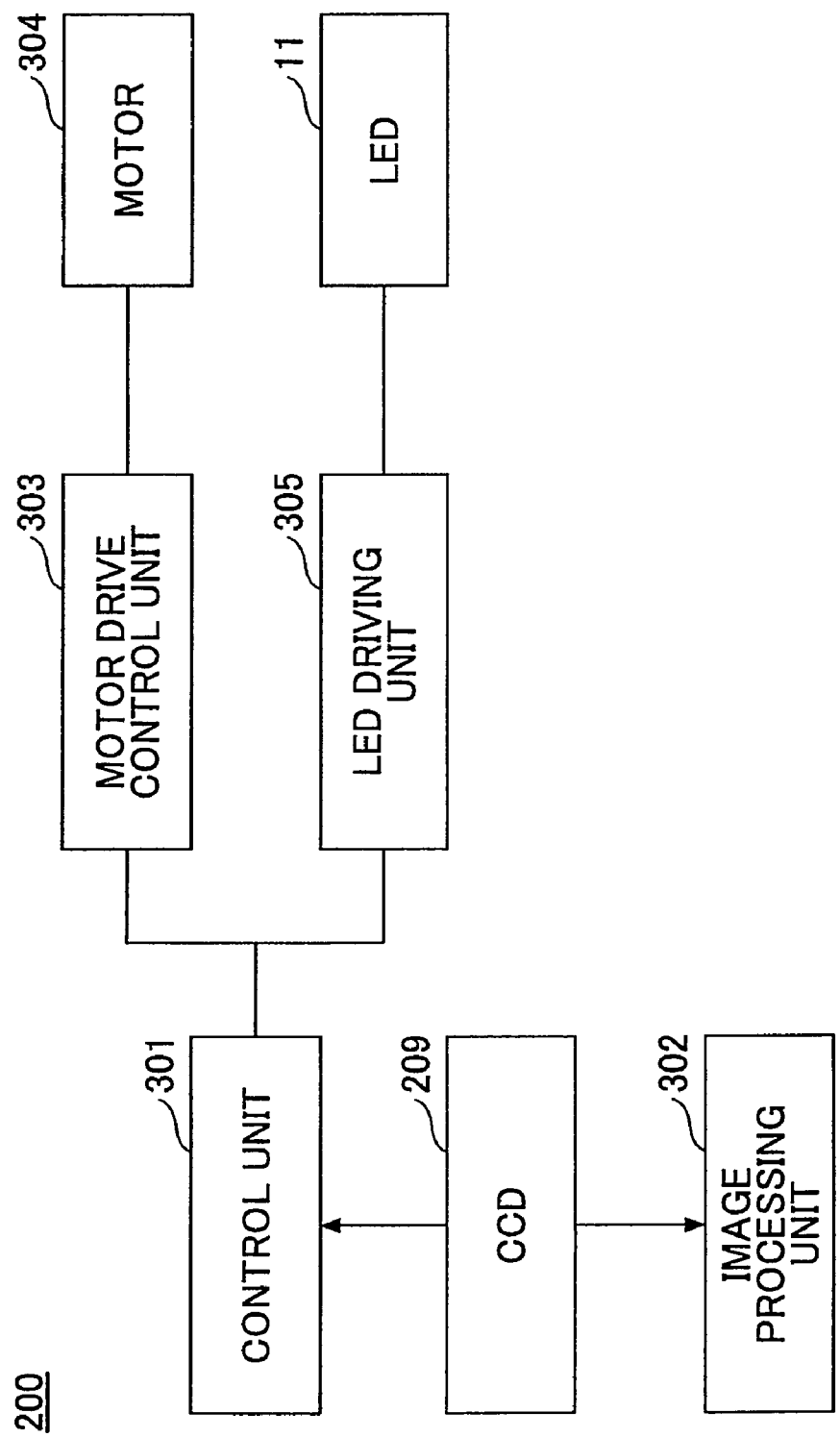
FIG. 5 is a block diagram of a control system of an image scanning unit.

FIG. 5 is a block diagram of a control system of the image scanning unit 200. The image scanning unit 200 is controlled by the control unit 301. A motor drive control unit 303, an LED driving unit 305, and the CCD 209 are connected to the control unit 301. A motor 304 is connected to the motor drive control unit 303, and the LEDs 11 are connected to the LED driving unit 305. Also, the image processing unit 302 is connected to the CCD 209.

The motor drive control unit 303 controls the rotational speed of the motor 304. The motor 304 is a driving source for moving the first carriage 206 in the sub-scanning direction.

The LED driving unit 305 turns on and off the LEDs 11. More specifically, the LED driving unit 305 supplies an electric current controlled by a PWM signal or a variable resistor to the LEDs 11 to cause the LEDs 11 to emit light with a predetermined illuminance. Light emitted from the LEDs 11 and reflected from the white reference plate 210 is focused on the CCD 209 via the first mirror 203, the second mirror 204, the third mirror 205, and the lens 208. During the shading correction, the control unit 301 monitors reflected light data in the main-scanning direction obtained by photoelectrically converting the reflected light with the CCD 209 and thereby detects failed LEDs 11.

Figure 6:
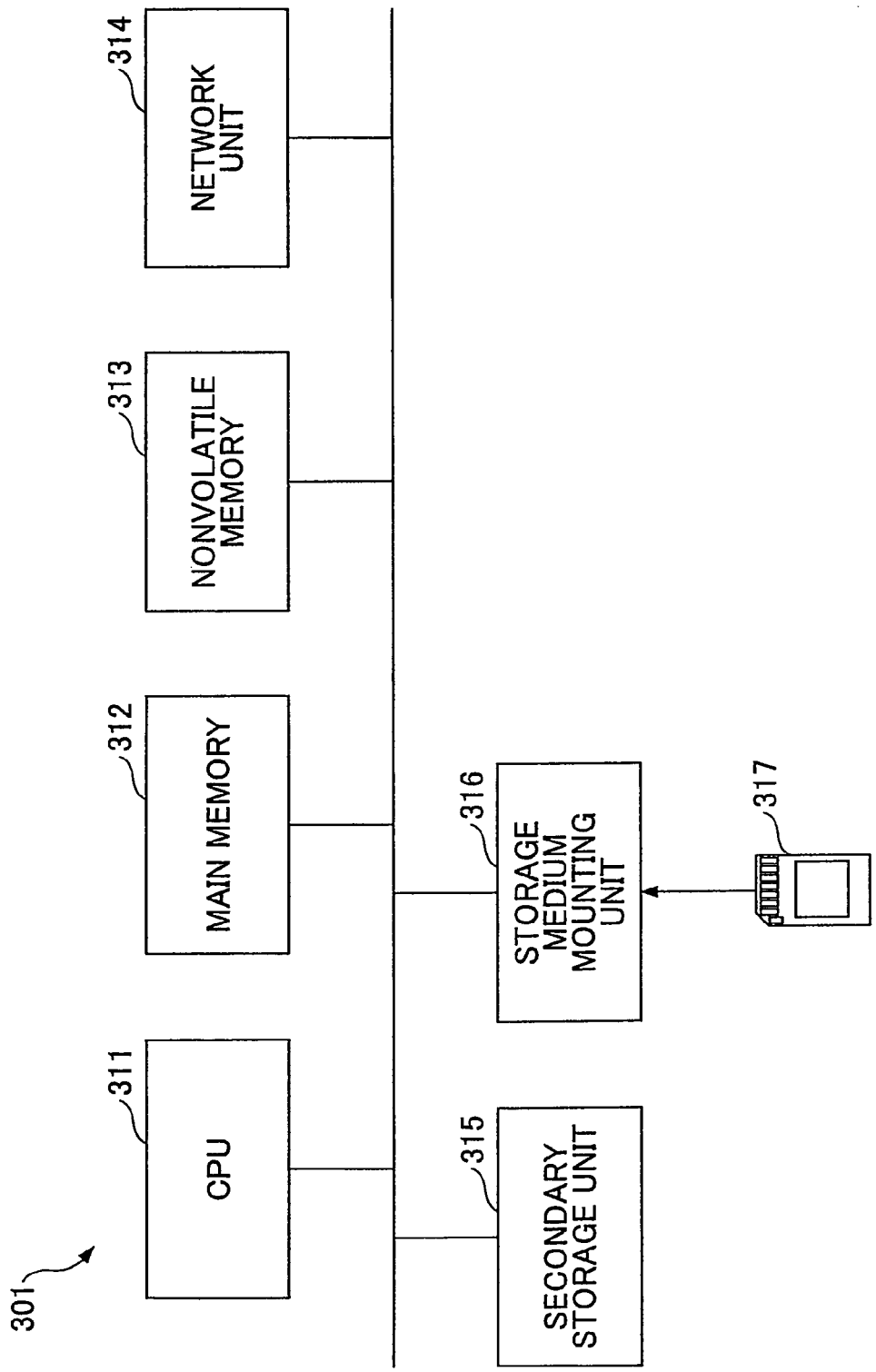
FIG. 6 is a block diagram of a control unit.

FIG. 6 is a block diagram of the control unit 301. The control unit 301 includes a CPU 311, a main memory 312, a nonvolatile memory 313, a network unit 314, a secondary storage unit 315, and a storage medium mounting unit 316. Not all components shown in FIG. 6 are necessarily included in the control unit 301. Some of the components may be mounted on a separate substrate and the configuration shown in FIG. 6 may be implemented by electrically connecting the control unit 301 and the substrate. The image forming apparatus 100 may also include an input unit and a display unit (not shown). The display unit is implemented, for example, by a liquid crystal display (LCD) and provides the user with visual information. The input unit, for example, includes hardware buttons (keys), directional keys, and a pointing device, and accepts user inputs. If a touch panel is provided together with the display unit, the input unit may be configured to receive user inputs via the touch panel.

Programs to be executed by the control unit 301 are provided, for example, via a storage medium 317 such as a memory card. When the storage medium 317 containing programs is mounted on the storage medium mounting unit 316, the storage medium mounting unit 316 reads the programs from the storage medium 317 and installs the programs in the secondary storage unit 315. Alternatively, programs may be downloaded via a network from a server (not shown) and installed in the secondary storage unit 315.

The secondary storage unit 315 stores the installed programs and other necessary files and data. The secondary storage unit 315 is implemented, for example, by a hard disk drive (HDD) or a nonvolatile memory such as a solid state drive (SSD).

When the image forming apparatus 100 is turned on, the programs are read from the secondary storage unit 315 and stored in the main memory 312. The main memory 312 is implemented, for example, by a dual in-line memory module (DIMM) or a small outline-DIMM (SO-DIMM). The CPU 311 reads instructions and data written in the programs stored in the main memory 312 and executes the instructions to implement various functions.

The network unit 314 is implemented, for example, by a network interface card for connecting the image forming apparatus 100 to a network such as Ethernet (registered trademark).

Figure 7:
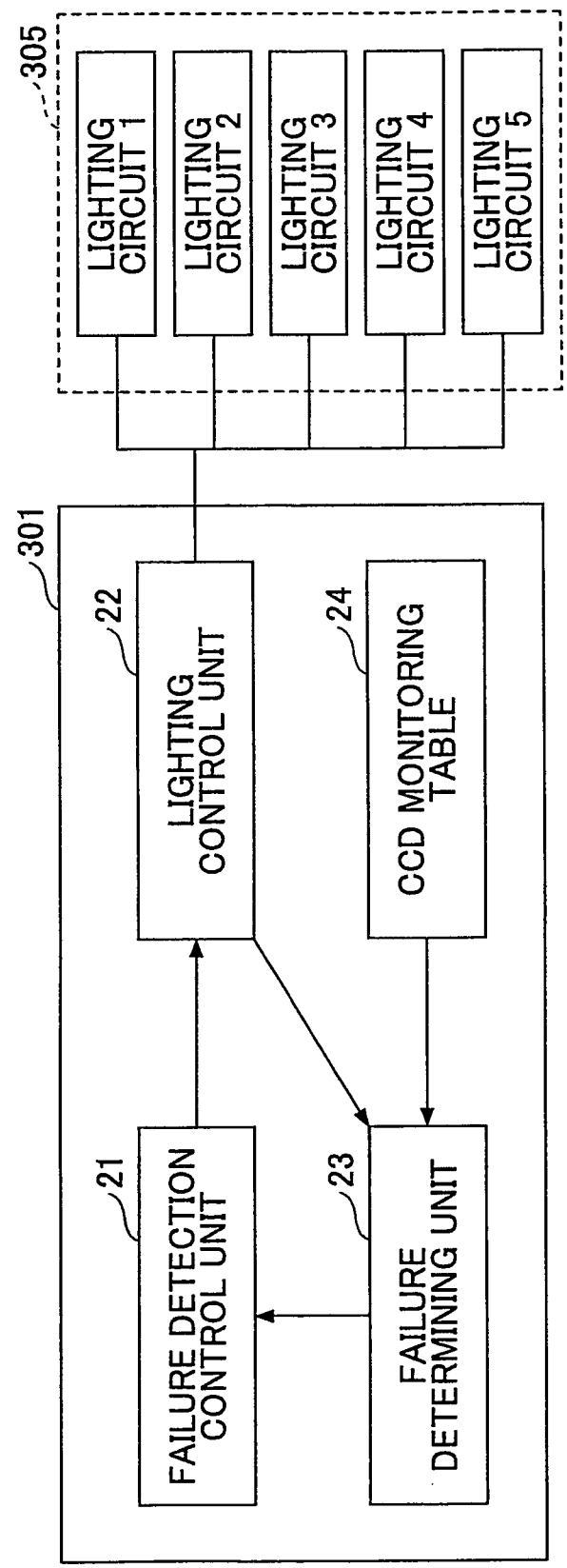
FIG. 7 is a functional block diagram of a control unit.

FIG. 7 is a functional block diagram of the control unit 301. The control unit 301 includes a failure detection control unit 21, a lighting control unit 22, and a failure determining unit 23. The functional blocks are implemented by executing the corresponding program(s) by the CPU 311. A CCD monitoring table (area information table) 24 is stored in the nonvolatile memory 313, such as a ROM, of the control unit 301.

The failure detection control unit 21 controls from the start to the end of a failure detection process. The lighting control unit 22 turns on lighting circuits 1 through 5 one by one in sequence or at random (each of the lighting circuits 1 through 5 may be called a lighting circuit 15 and the lighting circuits 1 through 5 may be collectively called the lighting circuits 15). The failure determining unit 23 obtains identification information of the turned-on lighting circuit 15 from the lighting control unit 22 and identifies CCD elements to be monitored by referring to the CCD monitoring table based on the identification information. Then, the failure determining unit 23 compares reflected light data detected by the identified CCD elements with a threshold A and thereby identifies failed (not turned on) LEDs 11.

<Detection of Failed LEDS in Positions Other than Ends of LED Array Board 12>

Before describing a light source failure detection method of this embodiment, a light source failure detection method according to the related art is described.

FIG. 8A is a drawing illustrating an LED driving unit 305' and LEDs 11' according to the related art. The LED driving unit 305' includes lighting circuits 1' through 5' that are connected to a control unit 301'. Multiple LEDs 11' (in this example, four LEDs 11') are connected in series to each of the lighting circuits 1' through 5'.

LEDs 11*a*1' through 11*a*4' connected to the lighting circuit 1' are arranged next to each other on an LED array board 12'. LEDs 11*b*1' through 11*b*4' connected to the lighting circuit 2' are arranged next to each other on the LED array board 12'. LEDs 11*c*1' through 11*c*4' connected to the lighting circuit 3' are arranged next to each other on the LED array board 12'. LEDs 11*d*1' through 11*d*4' connected to the lighting circuit 4' are arranged next to each other on the LED array board 12'. LEDs 11*e*1' through 11*e*4' connected to the lighting circuit 5' are arranged next to each other on the LED array board 12'.

FIG. 8B is a graph showing reflected light data obtained by detecting light reflected from the white reference plate 210 with the CCD 209 when the lighting circuits 1' through 5' are turned on by the control unit 301' and all the LEDs 11' are turned on by the lighting circuits 1' through 5'. At each end of the LED array board 12' where no LED 11' is present to the left or right of the LED 11' (LED 11*a*1' or LED 11*e*4'), the value of the reflected light data is the smallest. The value of the reflected light data gradually increases from each end of the LED array board 12' toward the center, and the value of the reflected light data is substantially constant in a region where light is emitted from right and left LEDs 11' (for example, a region corresponding to the LEDs 11a3' through 11e2'). In the descriptions below, regions where the value of the reflected light data increases or decreases are called end regions (corresponding to the LEDs 11a1' and 11a2' and the LEDs 11e3' and 11e4' in FIGS. 8A and 8B), and a region where the value of the reflected light data is, substantially constant is called a constant region.

Let us assume that the LED 11d1' in the constant region has failed and is not emitting light. The solid line in FIG. 8B indicates the reflected light data when the LED 11d1' is at fault. A part of the solid line corresponding to the LED 11d1' is indented. This indicates that the value of the reflected light data is low near the position corresponding to the LED 11d1'. The control unit 301' compares the reflected light data with a predetermined threshold and determines that the LED 11d1' is at fault if the corresponding part of the reflected light data is lower than or equal to the threshold.

In actual cases, however, even if all the LEDs are functioning normally, the value of the reflected light data obtained by detecting reflected light from the white reference plate 210 does not become constant as indicated by a dotted line shown in FIG. 8B, because of variations caused by a stain on the first, second, or third mirror, variations in the lighting current of LEDs, variations in the light intensity of LEDs, and variations in the sensitivity of the CCD 209.

To prevent mistakenly determining a normal LED as a failed LED, it is necessary to determine the threshold, i.e., to lower the threshold, taking into account the above variations. However, this makes it difficult to detect a failed LED.

In a reducing optical system where high illuminance is necessary, LEDs are densely arranged at a small pitch. In such a system, even if one LED has failed, its influence on the light intensity distribution is small (i.e., the value of reflected light data does not decrease much).

Therefore, even if one LED 11' (LED 11d1') in the constant region is at fault, the value of the reflected light data may not become lower than or equal to the threshold as indicated by the solid line in FIG. 8B. Thus, with the light source failure detection method of the related art, it is difficult to detect failure of one to several LEDs in the constant region.

In this embodiment, to prevent the above problem, LEDs 11 connected to each of the lighting circuits 1 through 5 are arranged apart from each other on the LED array board 12.

Figures 9A, 9B:
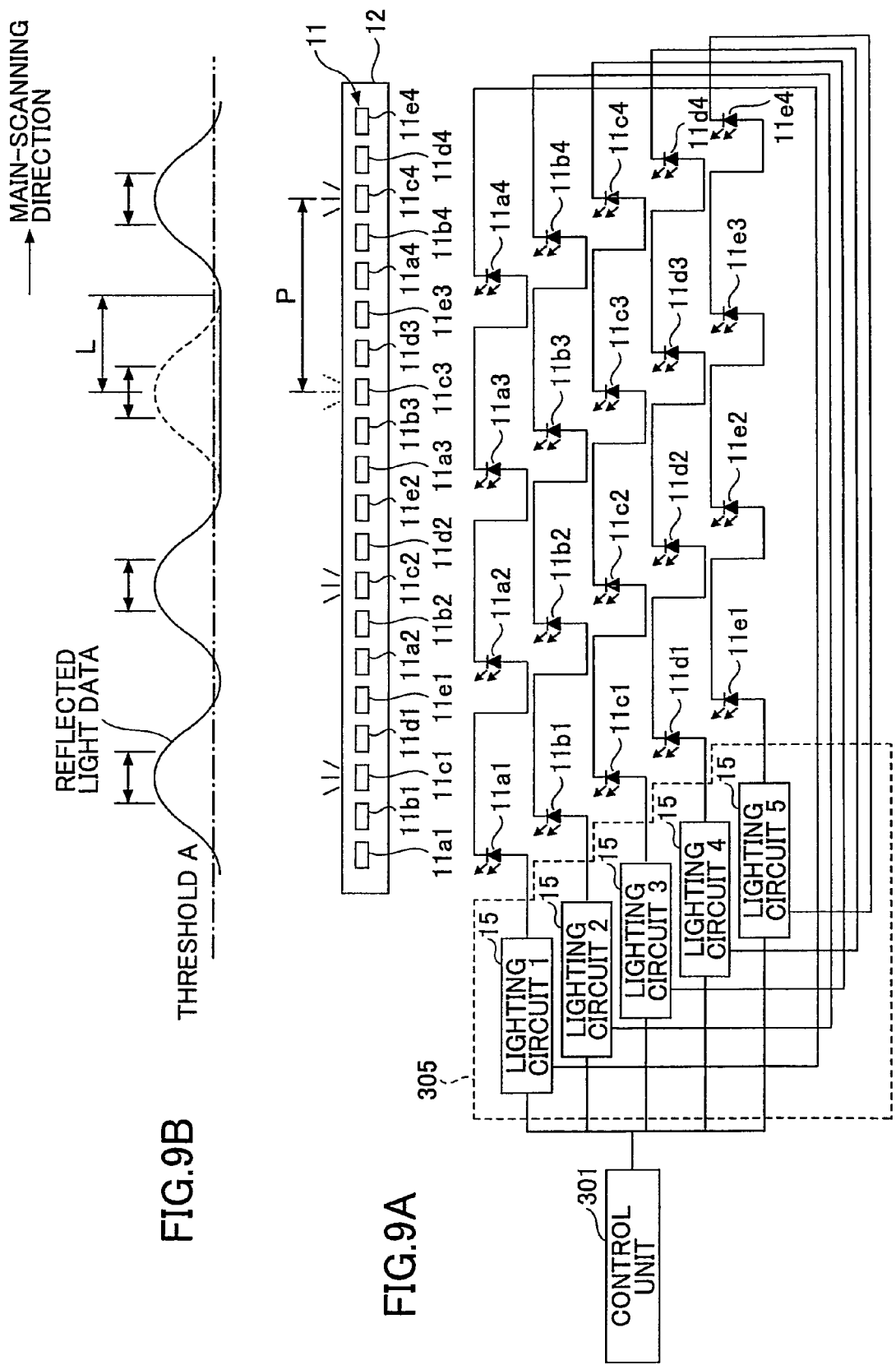
FIG. 9A is a drawing illustrating an LED driving unit and LEDs according to an embodiment of the present invention.
FIG. 9B is a graph showing exemplary reflected light data.

FIG. 9A is a drawing illustrating the LED driving unit 305 and the LEDs 11 of this embodiment. The LED driving unit 305 includes the lighting circuits 1 through 5 that are connected to the control unit 301. In FIG. 9A, different from FIG. 8A, four LEDs 11 connected to the same one of the lighting circuits 1 through 5 are arranged apart from each other on the LED array board 12 and the four LEDs 11 are connected in series.

For example, LEDs 11a1 through 11a4 connected to the lighting circuit 1 are arranged at a distance of four LEDs from each other (i.e., there are four LEDs 11 between each pair of the LEDs 11a1 through 11a4). The control unit 301 is capable of turning on the lighting circuits 1 through 5 separately. For example, when the control unit 301 turns on only the lighting circuit 1, the LEDs 11a1 through 11a4 connected in series to the lighting circuit 1 are turned on. Since the LEDs 11a1 through 11a4 are connected in series, only two wires are necessary between the lighting circuit 1 and the LED array board 12. Also, if an anode or cathode side wire is commonly used for the lighting circuits 1 through 5, only six wires are necessary between the lighting circuits 1 through 5 and the LED array board 12. Thus, the above configuration makes it possible to reduce the number of wires between the LED driving unit 305 and the LED array board 12 mounted on the first carriage 12. This in turn makes it possible to save space between the LED array board 12 and the control unit 301 and to reduce assembly costs.

Let us assume that the control unit 301 turns on only the lighting circuit 3. In this case, LEDs 11c1 through 11c4 are all turned on if they are functioning normally.

FIG. 9B is a graph showing reflected light data obtained by detecting light reflected from the white reference plate 210 with the CCD 209 when only the lighting circuit 3 is turned on by the control unit 301. In FIG. 9B, a dotted line indicates a case where all of the LED 11c1 through 11c4 are normally turned on and a solid line indicates a case where the LED 11c3 is at fault and not turned on.

Since the LEDs 11c1 through 11c4 are separated from each other by four LEDs 11, the reflected light data normally show peaks at positions corresponding to the LEDs 11c1 through 11c4. However, if the LED 11c3 is at fault, the value of the reflected light data of a main-scanning area corresponding to the LED 11c3 becomes zero (a reference level) because other LEDs 11 (the LEDs 11a3, 11b3, 11d3, and 11e3) near the LED 11c3 are not turned on and no reflected light enters the main-scanning area of the CCD 209 corresponding to the LED 11c3. In the image scanning unit 200, data output from an A/D converter (not shown) when the intensity of reflected light is zero is used as the black reference level. However, while the reflected light data are transmitted from the CCD 209 through a processing circuit to the A/D converter, an offset is given to the black reference level. For this reason, in the image scanning unit 200, the black reference level is adjusted to a value that does not become zero even if noise is taken into account. In the above case, the adjusted value is output as the reflected light data. Therefore, in this embodiment, the threshold A is set at a value corresponding to the black reference level or a value that is several digits higher than the black reference level. In FIG. 9B, the threshold A is indicated by a dashed-dotted line.

Here, to determine whether an LED is at fault or is intentionally turned off, the failure determining unit 23 needs to identify areas in the main-scanning direction (hereafter called main-scanning areas) where the reflected light data are supposed to show peaks or main-scanning areas where the reflected light data are supposed to become lower than or equal to the threshold A based on one of the lighting circuits 1 through 5 that is turned on. For this purpose, the control unit 301 includes the CCD monitoring table 24 where CCD element numbers of CCD elements to be monitored are registered in association with the lighting circuits 1 through 5.

FIG. 10 is a table showing an example of the CCD monitoring table 24. The CCD element numbers of CCD elements are determined according to main-scanning areas where they are present. In other words, groups of CCD element numbers represent main-scanning areas of the CCD 209. When the CCD elements are arranged in a single row, a main-scanning area is represented by a range (or length) in the main-scanning direction. Meanwhile, when the CCD elements are arranged in multiple rows, a main-scanning area is represented by a range (or length) in the main-scanning direction and the number of rows. The number of CCD elements in each main-scanning area may be one or more. The control unit 301 identifies CCD elements to be monitored by referring to the CCD monitoring table 24 based on the identification information of one of the lighting circuits 1 through 5 that has been turned on.

The CCD monitoring table 24 also includes LED numbers associated with the CCD element numbers. As shown in FIG.

10, CCD elements with the CCD element numbers 1 through 10 are used to detect reflected light corresponding to an LED (LED 11*a*1) with the LED number 1; CCD elements with the CCD element numbers 51 through 60 are used to detect reflected light corresponding to an LED (LED 11*a*2) with the LED number 6; CCD elements with the CCD element numbers 101 through 110 are used to detect reflected light corresponding to an LED (LED 11*a*3) with the LED number 11; and CCD elements with the CCD element numbers 151 through 160 are used to detect reflected light corresponding to an LED (LED 11*a*4) with the LED number 16.

Thus, with the CCD monitoring table 24, the control unit 301 can identify CCD element numbers of CCD elements to be monitored based on the identification number (1-5) of the lighting circuit 15 and identify the corresponding LED numbers based on the CCD element numbers. Thus, the above embodiment makes it possible to reliably detect even one failed LED 11 in the constant region which is difficult with the related-art technologies.

A preferable arrangement of the LEDs 11 is described below. In FIG. 9B, L indicates the spread or width (the distance between a peak and a substantially-zero point of the reflected light data or the corresponding width of the CCD 209) of light emitted from one LED 11 and entering the CCD 209, and P indicates the pitch between LEDs 11 connected to the same lighting circuit 15. If L is substantially the same as P, the minimum value of the reflected light data becomes about one half of the peak value. In this case, it is possible to detect one failed LED by setting the threshold A at a value that is slightly larger than one half of the peak value of the reflected light data. Accordingly, P is preferably greater than L (P>L) and is more preferably greater than 2L (P>2L). When P>2L, as shown in FIG. 9B, the minimum value of the reflected light data equals the black reference level. This in turn makes it possible to set the threshold A at a small value and thereby makes it easier to detect a failed LED.

Thus, arranging the LEDs 11 connected to the same lighting circuit 15 such that P becomes greater than a value between L and 2L enables the control unit 301 to accurately detect a failed LED 11 without being influenced by light emitted from other LEDs 11.

<Detection of Failed LEDS at Ends of LED Array Board 12>

Before describing a light source failure detection method of this embodiment, a light source failure detection method according to the related art is described.

FIG. 11A is a drawing illustrating the LED driving unit 305' and the LEDs 11' according to the related art. In FIG. 11, the same reference numbers are used for parts corresponding to those shown in FIG. 8A, and descriptions of those parts are omitted. FIG. 11B is a graph showing reflected light data obtained by detecting light reflected from the white reference plate 210 with the CCD 209 when the lighting circuits 1' through 5' are turned on by the control unit 301' and all the LEDs 11' are turned on by the lighting circuits 1' through 5'. In FIG. 11B, a dotted line indicates the reflected light data when all the LEDs 11' are functioning normally and a solid line indicates the reflected light data when the LED 11*e*4' at the right end of the LED array board 12' is at fault. The values of the reflected light data represented by the dotted line and the solid line are the same in the constant region but are different in the right end region. That is, even when an LED 11' in an end region fails, the reflected light data are uniform and are different from the reflected light data obtained when all the LEDs 11' are normal only in that the constant region is narrower. Thus, with the arrangement of the LEDs 11' as shown in FIG. 11A, it is difficult to determine whether the difference between the reflected light data represented by the solid line and the reflected light data represented by the dotted line is caused by the failure of an LED 11' (11*e*4') at an end of the LED array board 12 or by another reason such as inaccurate mounting positions of the LEDs 11' or a magnification error.

In this embodiment, to prevent the above problem, LEDs 11 connected to each of the lighting circuits 1 through 5 are arranged apart from each other on the LED array board 12.

Figure 12B:
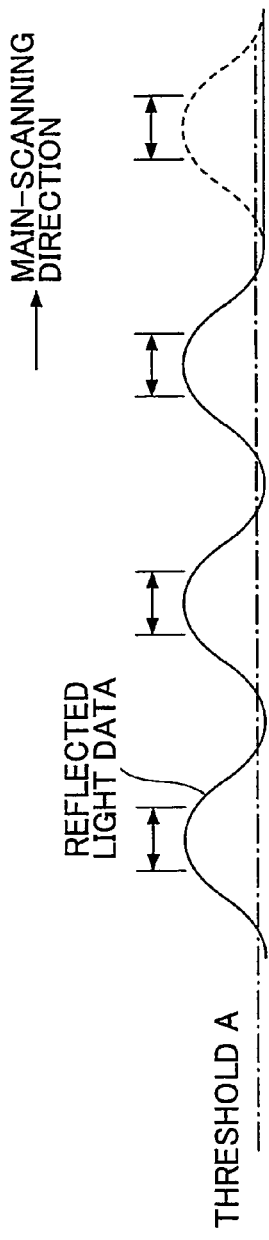
FIG. 12B is a graph showing exemplary reflected light data.
Figure 12A:
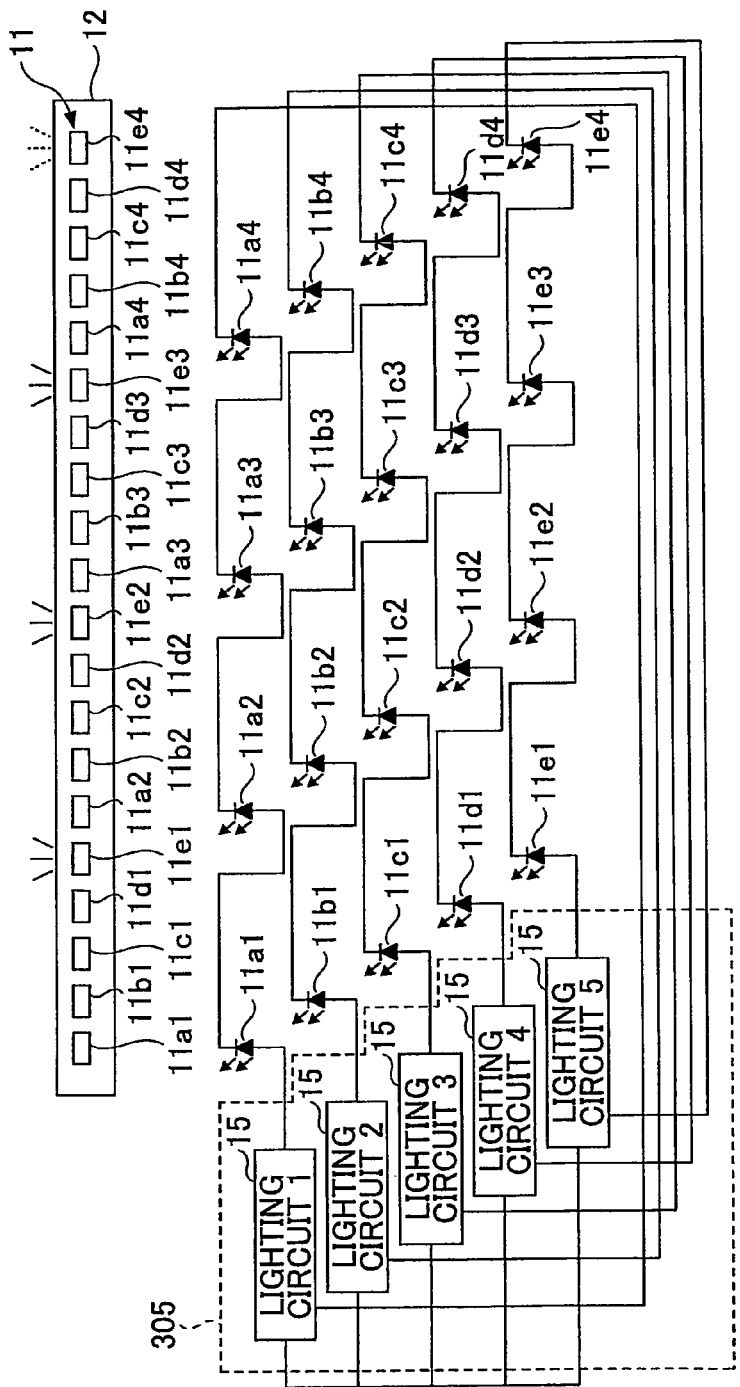
FIG. 12A is drawing illustrating an LED driving unit and LEDs according to an embodiment of the present invention.

FIG. 12A is a drawing illustrating the LED driving unit 305 and the LEDs 11 of this embodiment. FIG. 12A is substantially the same as the FIG. 9A.

Let us assume that the control unit 301 turns on only the lighting circuit 5. In this case, the LEDs 11*e*1 through 11*e*4 are all turned on if they are functioning normally.

FIG. 12B is a graph showing reflected light data obtained by detecting light reflected from the white reference plate 210 with the CCD 209 when only the lighting circuit 5 is turned on by the control unit 301. In FIG. 12B, a dotted line indicates a case where all of the LEDs 11*e*1 through 11*e*4 are turned on normally and a solid line indicates a case where the LED 11*e*4 is at fault and not turned on.

Since the LEDs 11*e*1 through 11*e*4 are separated from each other by four LEDs 11, the reflected light data normally show peaks at positions corresponding to the LEDs 11*e*1 through 11*e*4. However, if the LED 11*e*4 is at fault, the value of the reflected light data of a main-scanning area corresponding to the LED 11*e*4 becomes zero (a reference level) because no reflected light enters the main-scanning area of the CCD 209 corresponding to the LED 11*e*4. In other words, a portion (indicated by the dotted line) of the reflected light data is lost. Therefore, in this embodiment, the threshold A is set at a value corresponding to the black reference level or a value that is several digits higher than the black reference level. With this configuration, the control unit 301 is able to detect even one failed LED 11 in an end region by comparing the reflected light data with the threshold A.

<Comparison with Related Art>

It is also possible to detect one failed LED 11 in the constant region by using a configuration where the LEDs 11 are connected independently to the lighting circuit 15.

Figure 13:
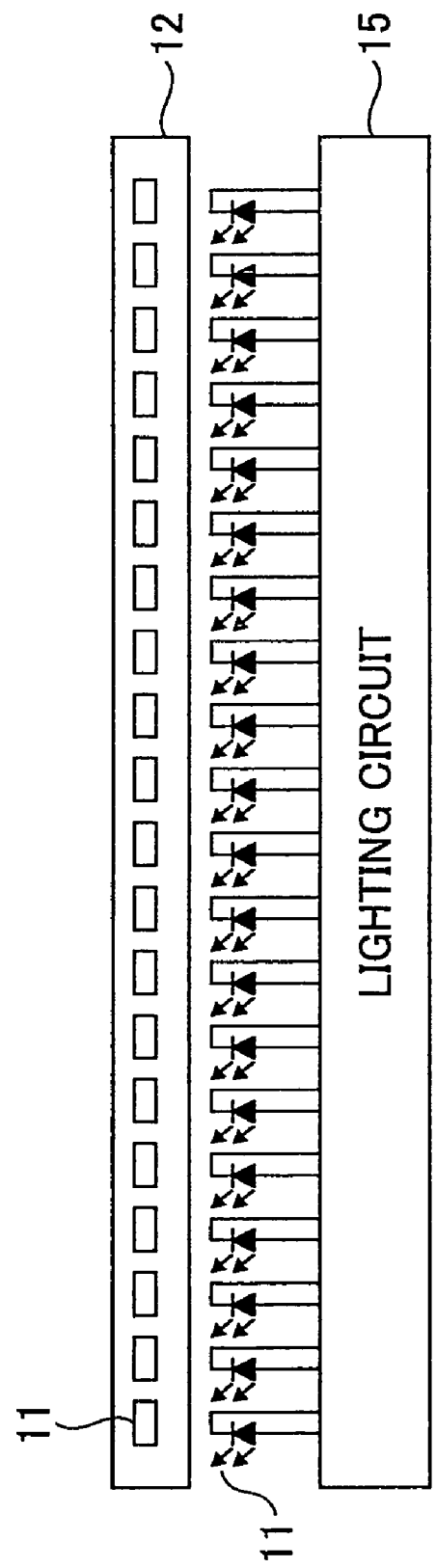
FIG. 13 is a drawing illustrating LEDs connected independently to a lighting circuit.

FIG. 13 is a drawing illustrating the LEDs 11 connected independently to the lighting circuit 15. In FIG. 13, the LEDs 11 are independently connected to the lighting circuit 15 so that the LEDs 11 can be turned on independently. Accordingly, this configuration requires wires for the number of the LEDs 11. As described above, since the LEDs 11 (or the LED array board 12) are mounted on the first carriage 206, it is necessary to extend wires connecting the LEDs 11 and the lighting circuits 15 between the first carriage 206 and the lighting circuits 15. Since a large number of LEDs are densely arranged at a small pitch in a reducing optical system to provide high illuminance, it is difficult to properly lay out the wires for the large number of LEDs. Also, providing a large number of wires makes it necessary to increase the size of the housing of the image scanning unit 200. Further, the configuration of FIG. 13 makes it necessary to increase the number of wiring patterns on the LED array board 12 and thereby to increase the size of the LED array board 12.

Meanwhile, in the image scanning unit 200 of this embodiment, LEDs 11 of each group are connected in series to the corresponding one of the lighting circuits 1 through 5 and are arranged apart from each other on the LED array board 12. Compared with the related art (FIG. 13), this configuration makes it possible to reduce the number of wires connecting the lighting circuits 1 through 5 and the LED array board 12 to one "n"th ("n" indicates the number of LEDs (4, in this example) connected to each lighting circuit). This configuration also makes it easier to lay out the wires and eliminates the need to increase the size of the housing of the image scanning unit 200.

Further, with the image scanning unit 200 of this embodiment, it is possible to test multiple (four in the above embodiment) LEDs 11 at the same time by turning on one of the lighting circuits 1 through 5 by the control unit 301. Compared with a case where the LEDs 11 are connected independently to the lighting circuit 15, the above embodiment makes it possible to reduce the time for the failure detection test to one "n"th ("n" indicates the number of LEDs connected to each lighting circuit).

Just for reference, Japanese Patent Application Publication No. 2008-124891 discloses an illumination system where a light guide plate is provided between LEDs and a document surface to diffuse emitted light. With such an illumination system, it is difficult to identify the position of an LED because of the diffusion and therefore it is difficult to detect one failed LED by visual inspection.

<Failure Detection Process>
<Method A>

Figure 14:
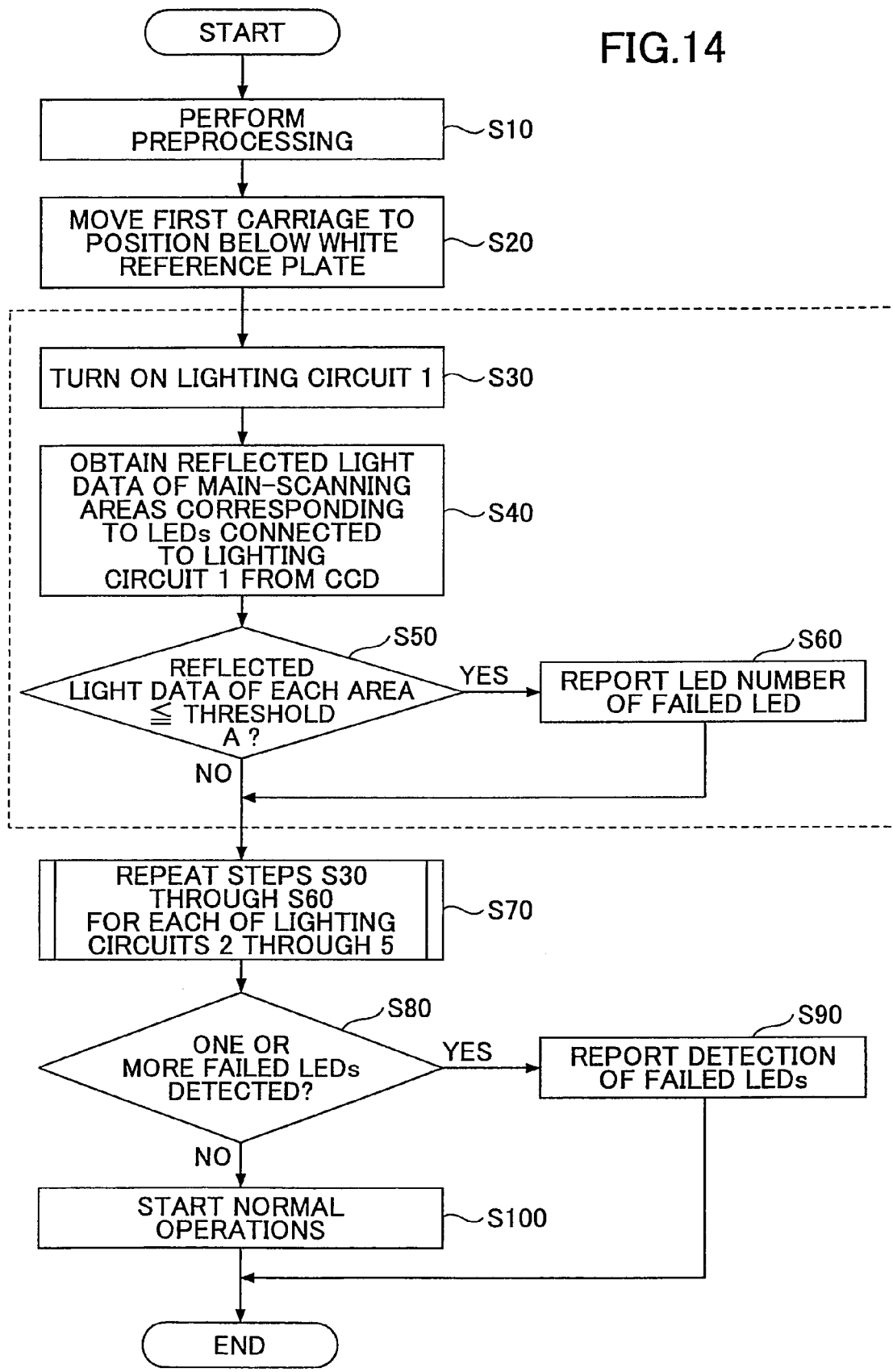
FIG. 14 is a flowchart showing an exemplary failure detection process performed by a control unit.

FIG. 14 is a flowchart showing a failure detection process performed by the control unit 301 to detect failed LEDs. The failure detection process of FIG. 14 is started, for example, immediately after the image forming apparatus 100 is powered on. This makes it possible to prevent the user from scanning a document without noticing failure of one or more LEDs.

Generally, after an image forming apparatus is powered on, auto gain control (AGC) and black level adjustment are performed to adjust the output range of digital image data from the A/D converter and thereby to prevent overflow. The failure detection process of this embodiment is preferably performed after the adjustment of the output range to detect a failed LED based on an accurate output value. For this reason, when the power is turned on, the failure detection control unit 21 performs preprocessing such as the AGC and the black level adjustment (S10).

After the preprocessing, the failure detection control unit 21 moves the first carriage 206 to a position below the white reference plate 210 (S20). Here, if the AGC and the black level adjustment are performed with the first carriage 206 positioned below the white reference plate 210, the failure detection control unit 21 does not need to move the first carriage 206 in step S20. After moving the first carriage 206 to a position below the white reference plate 210, the failure detection control unit 21 requests the lighting control unit 22 to turn on the lighting circuits 1 through 5 one by one.

The lighting control unit 22, for example, turns on the lighting circuits 1 through 5 in sequence. In this case, the lighting control unit 22 turns on the lighting circuit 1 first (S30). Then, the lighting control unit 22 reports to the failure determining unit 23 that the lighting circuit 1 has been turned on. In this step, the failure detection control unit 21 may scan the white reference plate 210 without moving the first carriage 206. In this case, however, only one line of reflected light data is obtained in the sub-scanning direction and the accuracy of the reflected light data may be influenced by, for example, dust on the white reference plate 210. For this reason, the failure detection control unit 21 may be configured to scan the white reference plate 210 while moving the first carriage 206.

The failure determining unit 23 obtains, from the CCD 209, reflected light data of main scanning areas corresponding to the LEDs 11a1 through 11a4 connected to the lighting circuit 1 based on the CCD monitoring table (S40). In the example shown in FIG. 10, CCD elements with the CCD element numbers 1-10, 51-60, 101-110, and 151-160 correspond to the lighting circuit 1 (CCD elements with consecutive CCD element numbers are treated as a group). CCD elements in the same group (or for the same main-scanning area) detect reflected light corresponding to the same LED 11. However, the detected light intensity may vary even in the same group. Therefore, the failure determining unit 23 obtains an average or a median of reflected light data detected by the CCD elements in each group and compares the average or the median with the threshold A (S50). This makes it possible to detect even one failed LED 11 without being influenced by the variation in the detected light intensity.

If the reflected light data detected by the CCD elements of a group are lower than or equal to the threshold A (YES in step S50), the failure determining unit 23 refers to the CCD monitoring table 24 and reports the corresponding LED number (the LED number of the failed LED 11) to the failure detection control unit 21 (S60). The failure detection control unit 21 stores the LED number of the failed LED 11 in a memory such as a RAM. Needless to say, step S50 is performed for each group and the number of failed LEDs 11 connected to one lighting circuit 15 is not limited to one.

If the reflected light data detected by the CCD elements of a group are greater than the threshold A (NO in step S50), the failure determining unit 23 reports to the failure detection control unit 21 that the corresponding LED 11 is functioning normally. The failure detection control unit 21 repeats steps S30 through S60 for each of the lighting circuits 2 through 5 (S70).

After steps S30 through S60 are completed for all of the lighting circuits 1 through 5 and one or more failed LEDs 11 are detected (YES in step S80), the failure detection control unit 21 displays a message on the display unit (operations panel) or turns on a caution lamp to report to the user that failed LEDs 11 are detected (S90). In response, the user takes an appropriate action (e.g., contact a service person).

After steps S30 through S60 are completed for all of the lighting circuits 1 through 5 and no failed LED 11 is detected (NO in step S80), the failure detection control unit 21 terminates the failure detection process and the control unit 301 starts normal operations (e.g., scanning a document) (S100).

Thus, the image scanning unit 200 of this embodiment makes it possible to quickly and reliably detect failure of even one to several LEDs 11 in the constant region and the end regions without using complicated wiring between the lighting circuits 1 through 5 and the first carriage 206.

<Process B>

Figure 15:
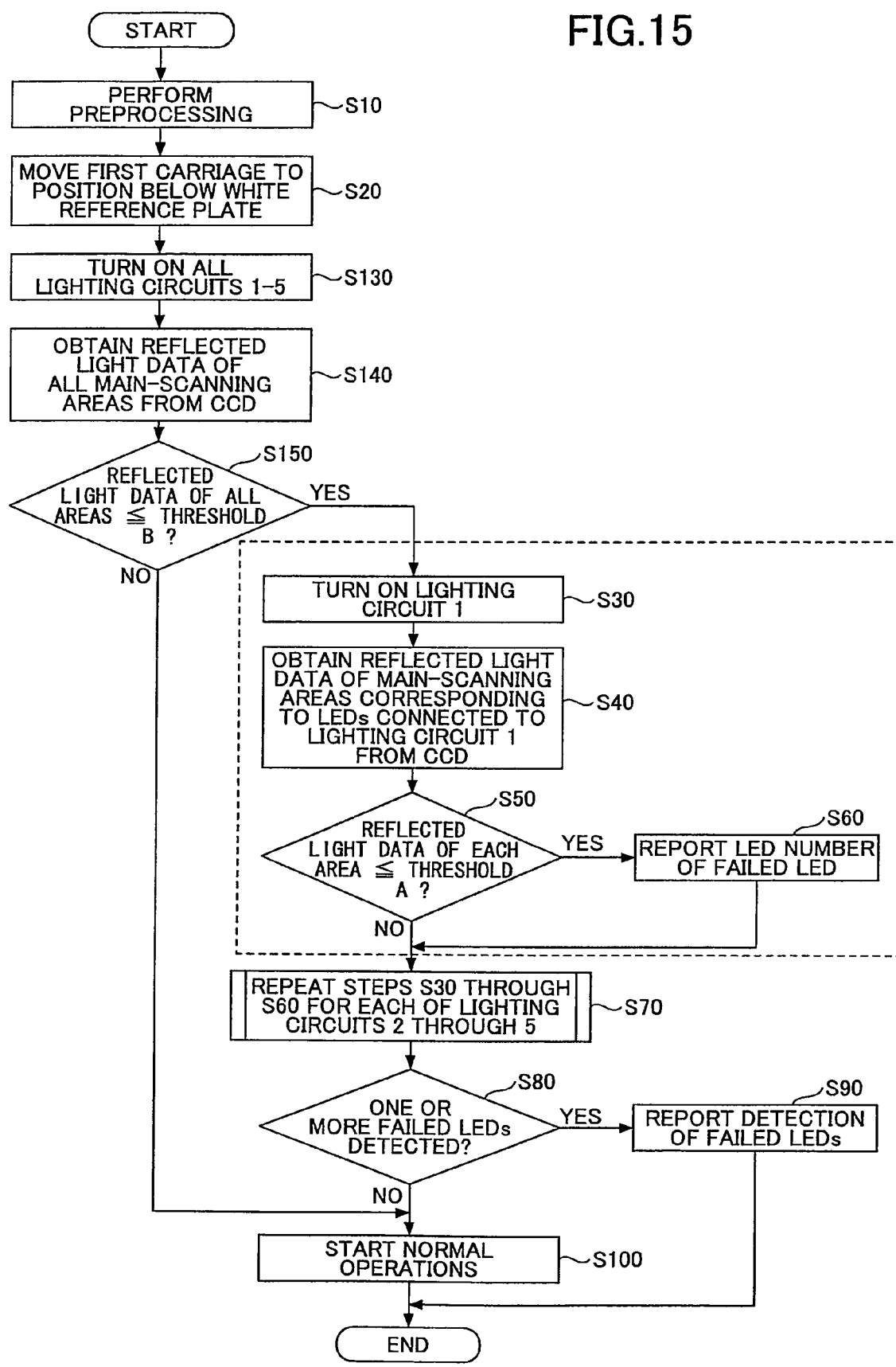
FIG. 15 is a flowchart showing another exemplary failure detection process performed by a control unit.

FIG. 15 is a flowchart showing another failure detection process performed by the control unit 301 to detect failed LEDs. In the failure detection process of FIG. 14, the lighting circuits 1 through 5 are turned on by the lighting control unit 22 one by one and the reflected light data are compared with the threshold A. Meanwhile, in the failure detection process of FIG. 15, the lighting control unit 22 turns on all LEDs 11 connected to the lighting circuits 1 through 5 to obtain reflected light data of all main-scanning areas and the failure determining unit 23 compares the obtained reflected light data with a threshold B. The failure determining unit 23 starts a process of detecting failure of the respective LEDs 11 only if the reflected light data of at least one main-scanning area are lower than or equal to the threshold B.

The failure detection process of FIG. 15 is started, for example, immediately after the image forming apparatus 100 is powered on. This makes it possible to prevent the user from scanning a document without noticing failure of one or more LEDs.

When the power is turned on, the failure detection control unit 21 performs preprocessing such as the AGC and the black level adjustment (S10). After the preprocessing, the failure detection control unit 21 moves the first carriage 206 to a position below the white reference plate 210 (S20). Here, if the AGC and the black level adjustment are performed with the first carriage 206 positioned below the white reference plate 210, the failure detection control unit 21 does not need to move the first carriage 206 in step S20. After moving the first carriage 206 to a position below the white reference plate 210, the failure detection control unit 21 requests the lighting control unit 22 to turn on the lighting circuits 1 through 5.

In this case, the lighting control unit 22 turns on all the lighting circuits 1 through 5 (S130). Then, the lighting control unit 22 reports to the failure determining unit 23 that all the lighting circuits 1 through 5 have been turned on. The failure detection control unit 21 may be configured to scan the white reference plate 210 while moving the first carriage 206 to reduce degradation of the reflected light data caused by, for example, dust on the white reference plate 210.

The failure determining unit 23 obtains reflected light data of all main-scanning areas from the CCD 209 (S140). The failure determining unit 23 determines whether the reflected light data of all main-scanning areas are lower than or equal to the threshold B (S150). If the reflected light data of at least one of the main-scanning areas are lower than or equal to the threshold B, the result of step S150 becomes YES.

The threshold B is greater than the threshold A (threshold B>threshold A). The threshold A is set at a value corresponding to the black reference level or a value that is several digits higher than the black reference level. Therefore, when all the LEDs 11 are turned on, the reflected light data does not become lower than or equal to the threshold A even if one LED 11 is at fault. Therefore, the threshold B is set at a value greater than the threshold A to allow the failure determining unit 23 to determine whether there are one or more failed LEDs 11 even when all the LEDs 11 are turned on. For example, the threshold B is set at a value that is about one half of the value of reflected light data in the constant region.

If the reflected light data of all main-scanning areas are greater than the threshold B (NO in step S150), the failure determining unit 23 reports to the failure detection control unit 21 that all the LEDs 11 are functioning normally. This method eliminates the need to perform failure detection for each of the lighting circuits 1 through 5 if all the LEDs 11 are functioning normally and thereby makes it possible to return to normal operations faster than the method of FIG. 14.

If the reflected light data of at least one of the main-scanning areas are lower than or equal to the threshold B (YES in step S150), the failure determining unit 23 performs steps similar to those shown in FIG. 14. For example, the lighting control unit 22 turns on the lighting circuits 1 through 5 in sequence. First, the lighting control unit 22 turns on the lighting circuit 1 (S30). Then, the lighting control unit 22 reports to the failure determining unit 23 that the lighting circuit 1 has been turned on. Here, the failure detection control unit 21 is preferably configured to scan the white reference plate 210 while moving the first carriage 206 to reduce degradation of the reflected light data caused by, for example, dust on the white reference plate 210.

The failure determining unit 23 obtains, from the CCD 209, reflected light data of main scanning areas corresponding to the LEDs 11 connected to the lighting circuit 1 based on the CCD monitoring table 24 (S40). In the example shown in FIG. 10, CCD elements with the CCD element numbers 1-10, 51-60, 101-110, and 151-160 correspond to the lighting circuit 1 (CCD elements with consecutive CCD element numbers are treated as a group). The failure determining unit 23 obtains an average or a median of reflected light data detected by the CCD elements in each group and compares the average or the median with the threshold A (S50). This makes it possible to detect even one failed LED 11.

If the reflected light data detected by the CCD elements of a group is lower than or equal to the threshold A (YES in step S50), the failure determining unit 23 refers to the CCD monitoring table 24 and reports the corresponding LED number (the number of the failed LED 11) to the failure detection control unit 21 (S60). The failure detection control unit 21 stores the LED number of the failed LED 11 in a memory such as a RAM. Needless to say, step S50 is performed for each group and the number of failed LEDs 11 connected to one lighting circuit 15 is not limited to one.

If the reflected light data detected by the CCD elements of a group are greater than the threshold A (NO in step S50), the failure determining unit 23 reports to the failure detection control unit 21 that the corresponding LED 11 is functioning normally. The failure detection control unit 21 repeats steps S30 through S60 for each of the lighting circuits 2 through 5 (S70).

After steps S30 through S60 are completed for all of the lighting circuits 1 through 5 and one or more failed LEDs 11 are detected (YES in step S80), the failure detection control unit 21 displays a message on the display unit (operations panel) or turns on a caution lamp to report to the user that failed LEDs 11 are detected (S90). In response, the user takes an appropriate action (e.g., contact a service person).

After steps S30 through S60 are completed for all of the lighting circuits 1 through 5 and no failed LED 11 is detected (NO in step S80), the failure detection control unit 21 terminates the failure detection process and the control unit 301 starts normal operations (e.g., scanning a document) (S100).

Thus, the image scanning unit 200 of this embodiment makes it possible to quickly and reliably detect failure of even one to several LEDs 11 in the constant region and the end regions without using complicated wiring between the lighting circuits 1 through 5 and the first carriage 206. Also, the method B requires less time than the method A.

As described above, embodiments of the present invention make it possible to provide an image scanning device, an image forming apparatus, and a light source failure detection method that are capable of detecting even one failed LED located at an end in the main-scanning direction without complicating the wiring connecting LEDs.

The present invention is not limited to the specifically disclosed embodiments, and variations and modifications may be made without departing from the scope of the present invention.

The present application is based on Japanese Priority Application No. 2009-236536, filed on Oct. 13, 2009, the entire contents of which are hereby incorporated herein by reference.

What is claimed is:

1. An image scanning device for generating image data of a target medium, comprising:
   lighting circuits;
   a light source including light-emitting elements connected to the lighting circuits, the light-emitting elements being arranged in a line such that a group of the light-emitting elements connected in series to a same one of the lighting circuits are not positioned adjacent to each other;
   a reflecting part for shading correction extending in a main-scanning direction;
   a photoelectric conversion unit photoelectrically converting reflected light from the reflecting part;

a lighting control unit selectively turning on one of the lighting circuits;

a memory storing an area information table containing information on main-scanning areas of the photoelectric conversion unit in association with identification information of the lighting circuits; and a failure determining unit identifying the main-scanning areas of the photoelectric conversion unit corresponding to the identification information of the one of the lighting circuits turned on by the lighting control unit by referring to the area information table, and comparing intensities of the reflected light entering the identified main-scanning areas with a first threshold to determine whether the light-emitting elements connected to the one of the lighting circuits are at fault.

2. The image scanning device as claimed in claim 1, wherein a pitch between the light-emitting elements connected to the same one of the lighting circuits is greater than a distance between a peak and a substantially-zero point of a signal obtained by photoelectrically converting the reflected light corresponding to one of the light emitting elements by the photoelectric conversion unit.

3. The image scanning device as claimed in claim 1, further comprising:

a failure detection control unit starting a process of detecting failure of the light-emitting elements after the image scanning device is powered on and before the image data of the target medium are generated.

4. The image scanning device as claimed in claim 1, further comprising:

a failure detection control unit moving the light source with respect to the reflecting part while the photoelectric conversion unit photoelectrically converts the reflected light.

5. The image scanning device as claimed in claim 1, further comprising:

a failure detection control unit requesting the lighting control unit to turn on all the lighting circuits and thereby to turn on all the light-emitting elements, and starting a process of detecting failure of the respective light-emitting elements only if the intensity of the reflected light entering at least one of the main-scanning areas of the photoelectric conversion unit is lower than or equal to a second threshold.

6. The image scanning device as claimed in claim 5, wherein the second threshold is greater than the first threshold.

7. The image scanning device as claimed in claim 1, wherein the first threshold is set at a value corresponding to a black reference level or a value slightly greater than the black reference level.

8. An image forming apparatus, comprising:

the image scanning device of claim 1; and an image forming unit forming an image on a recording medium based on image data generated by the image scanning device.

9. A method of detecting light source failure for an image scanning device, the image scanning device comprising lighting circuits;

a light source including light-emitting elements connected to the lighting circuits, the light-emitting elements being arranged in a line such that a group of the light-emitting elements connected in series to a same one of the lighting circuits are not positioned adjacent to each other;

a reflecting part for shading correction extending in a main-scanning direction;

a photoelectric conversion unit photoelectrically converting reflected light from the reflecting part;

a lighting control unit;

a memory storing an area information table containing information on main-scanning areas of the photoelectric conversion unit in association with identification information of the lighting circuits; and a failure determining unit, the method comprising the steps of:

selectively turning on one of the lighting circuits by the lighting control unit;

identifying, by the failure determining unit, the main-scanning areas of the photoelectric conversion unit corresponding to the identification information of the one of the lighting circuits turned on by the lighting control unit by referring to the area information table; and comparing, by the failure determining unit, intensities of the reflected light entering the identified main-scanning areas with a first threshold to determine whether the light-emitting elements connected to the one of the lighting circuits are at fault.

* * * * *